(12) United States Patent
Horak et al.

(10) Patent No.: US 12,510,142 B2
(45) Date of Patent: Dec. 30, 2025

(54) AXLE ASSEMBLY WITH DIFFERENTIAL AND CLUTCH

(71) Applicant: GKN Automotive Limited, Birmingham (GB)

(72) Inventors: Kevin P. Horak, Clarkston, MI (US); Kazunobu Takeshita, West Bloomfield, MI (US)

(73) Assignee: GKN Automotive Limited, Birmingham (GB)

( * ) Notice: Subject to any disclaimer, the term of this patent is extended or adjusted under 35 U.S.C. 154(b) by 4 days.

(21) Appl. No.: 18/889,564

(22) Filed: Sep. 19, 2024

(65) Prior Publication Data

US 2025/0109783 A1 Apr. 3, 2025

Related U.S. Application Data

(60) Provisional application No. 63/541,558, filed on Sep. 29, 2023.

(51) Int. Cl.
| | |
|---|---|
| *F16H 37/08* | (2006.01) |
| *B60K 1/00* | (2006.01) |
| *B60K 17/04* | (2006.01) |
| *B60K 17/16* | (2006.01) |
| *F16H 48/22* | (2006.01) |
| *F16H 48/24* | (2006.01) |

(52) U.S. Cl.
CPC ......... *F16H 37/0813* (2013.01); *B60K 1/00* (2013.01); *B60K 17/043* (2013.01); *B60K 17/165* (2013.01); *F16H 48/22* (2013.01); *F16H 48/24* (2013.01); *B60K 2001/001* (2013.01)

(58) Field of Classification Search
CPC .. B60K 2001/001; B60K 17/165; B60K 1/00; F16H 48/24; F16H 48/22
See application file for complete search history.

(56) References Cited

U.S. PATENT DOCUMENTS

| | | | | |
|---|---|---|---|---|
| 8,876,643 | B2* | 11/2014 | Fickel | F16H 3/54 |
| | | | | 475/5 |
| 8,992,366 | B2 | 3/2015 | Gassmann | |
| 9,435,415 | B2 | 9/2016 | Gassmann | |
| 9,637,127 | B1* | 5/2017 | Cooper | B60W 10/115 |
| 11,174,927 | B2 | 11/2021 | Broicher et al. | |
| 11,313,446 | B2* | 4/2022 | Himmelbauer | B60K 23/04 |
| 2022/0099171 | A1 | 3/2022 | Schmidt et al. | |

* cited by examiner

*Primary Examiner* — Derek D Knight
(74) *Attorney, Agent, or Firm* — Reising Ethington P.C.

(57) ABSTRACT

An axle assembly includes a gear train having multiple outputs that rotate at different speeds. A differential is engaged with a first output at a first speed, and a clutch is engaged with a second output at a second speed, and the second speed is lower than the first speed. The first output may be radially spaced from the second output, relative to axes of rotation of the differential and the clutch.

19 Claims, 2 Drawing Sheets

AXLE ASSEMBLY WITH DIFFERENTIAL AND CLUTCH

REFERENCE TO RELATED APPLICATIONS

This application claims the benefit of U.S. Provisional Application Ser. No. 63/541,558 filed on Sep. 29, 2023 the entire content of which is incorporated herein by reference in its entirety.

TECHNICAL FIELD

The present disclosure relates generally to an axle assembly including a differential and a clutch.

BACKGROUND

Electric vehicles may include powerful motors arranged in axle assemblies that include gears to change the torque and rotary speed output of the motor, as desired. The axle assemblies may include differentials and clutches, and including the differential at a final drive speed results in higher rotary speeds for the differential and the effect of lash and engagement forces, and the engagement speeds of components are thus increased according to the final drive speed.

SUMMARY

In at least some implementations, an axle assembly includes first and second gear reduction stages, a differential, a clutch and first and second side shafts. The first gear reduction stage includes a first stage input gear coupled to and rotating a first stage output gear. The differential includes a differential input gear coupled to the first stage output gear, a pinion gear, a first side gear coupled to the pinion gear and a second side gear coupled to the pinion gear, a first differential output shaft that is coupled to and rotated by the first side gear, and a second differential output shaft coupled to and rotating with the second side gear. The second gear reduction stage includes a pair of second stage input gears with a first one of the second stage input gears being coupled to and rotated by the first differential output shaft, and with a second one of the second stage input gears being coupled to and rotated by the second differential output shaft. The second gear reduction stage includes a pair of second stage output gears, with a first one of the second stage output gears being coupled to and rotated by the first one of the second stage input gears, and with a second one of the second stage output gears being coupled to and rotated by the second one of the second stage input gears. The first side shaft is coupled to and rotated by the first one of the second stage output gears, and the second side shaft is coupled to and rotated by the second one of the second stage output gears. The clutch is connected to the first side shaft and to the second side shaft and has a decoupled state in which relative rotation between the first side shaft and the second shaft is permitted and a coupled state in which relative rotation between the first side shaft and second side shaft is prevented in at least some operating conditions.

In at least some implementations, a motor and a drive gear rotated by the motor are included, wherein the drive gear is coupled to and rotates the first stage input gear.

In at least some implementations, the differential is an open differential. In at least some implementations, the clutch is a friction clutch or a dog clutch. In at least some implementations, the clutch is a friction clutch that includes limited slip capability.

In at least some implementations, a first part of the clutch is coupled to and rotates with the first side shaft and a second part of the clutch is coupled to and rotates with the second side shaft, and wherein the first part of the clutch is engageable with the second part of the clutch in the coupled state.

In at least some implementations, the first differential output shaft is capable of rotating at a different rate than the second differential output shaft. In at least some implementations, the first one of the second stage input gears is capable of rotating at a different rate than the second one of the second stage input gears.

In at least some implementations, the drive gear is coupled to a motor output shaft, and the first differential output shaft and the second differential output shaft are parallel to each other and parallel to the motor output shaft. In at least some implementations, the first side shaft and the second side shaft are both parallel to the motor output shaft.

In at least some implementations, an axle assembly includes first and second gear reduction stages, a differential and a clutch. The first gear reduction stage includes a first stage input that rotates at a first speed and a first stage output that rotates at a second speed that is less than the first speed. The second gear reduction stage includes a second stage input that rotates at a third speed and a second stage output that rotates at a fourth speed that is less than the third speed. The differential has an input gear rotated by the first stage output, a first output that rotates at a first output speed and a second output that rotates at a second output speed, and the first output speed and second output speed may be the same or different. A first side shaft is coupled to and rotated by the first output, and a second side shaft is coupled to and rotated by the second output. The clutch is connected to the first side shaft and to the second side shaft and has a decoupled state in which relative rotation between the first side shaft and the second shaft is permitted and a coupled state in which relative rotation between the first side shaft and second side shaft is prevented in at least some operating conditions.

In at least some implementations, the second stage input includes a first input gear coupled to the first output and a second input gear coupled to the second output, and wherein the second stage output includes a first output gear coupled to the first input gear, and a second output gear coupled the second input gear, and wherein the first side shaft is coupled to the first output through the first output gear and the first input gear, and the second side shaft is coupled to the second output through the second output gear and the second input gear.

In at least some implementations, a motor is provided and a drive gear is rotated by the motor, and the drive gear is coupled to and rotates the first stage input.

In at least some implementations, the first output of the differential and the second output of the differential are parallel to each other and parallel to an axis of rotation of the drive gear.

In at least some implementations, an axle assembly includes a gear train having multiple outputs that rotate at different speeds. A differential is engaged with a first output at a first speed, and a clutch is engaged with a second output at a second speed, and the second speed is lower than the first speed.

In at least some implementations, the first output is radially spaced from the second output, relative to axes of rotation of the differential and the clutch.

BRIEF DESCRIPTION OF THE DRAWINGS

The following detailed description of preferred embodiments and best mode will be set forth with reference to the accompanying drawings, in which.

DETAILED DESCRIPTION

Figure 1:
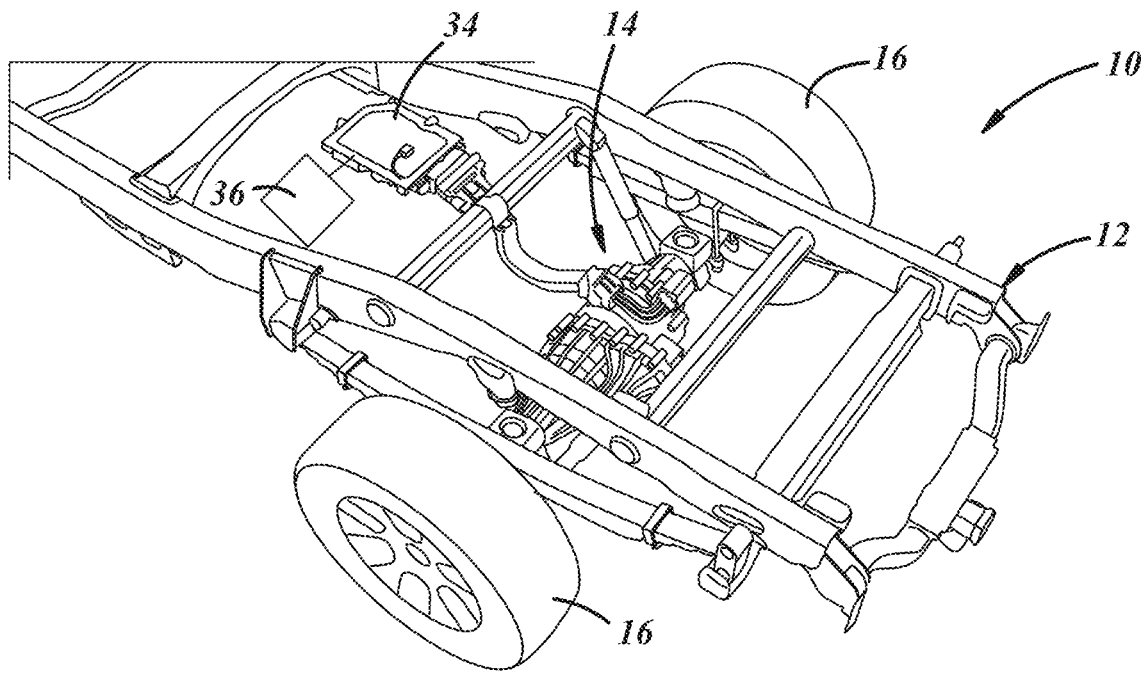
FIG. 1 is a perspective view of part of a vehicle support structure with an axle assembly.
Figure 2:
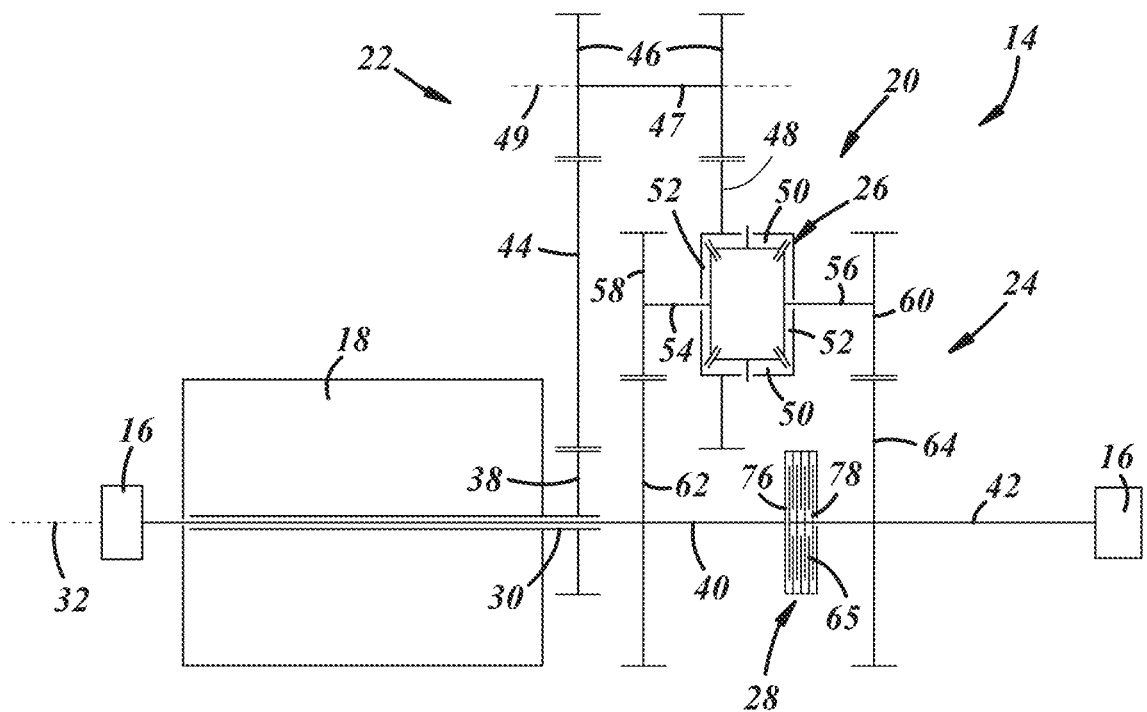
FIG. 2 is a diagrammatic view of the axle assembly 14 including an electric motor, a gear train, a differential and a clutch.

Referring in more detail to the drawings, FIG. 1 illustrates part of a vehicle 10 including a support structure, or frame 12, and an axle assembly 14 coupled to the frame 12 and to rear wheels 16. The arrangement shown in FIG. 1 is just one example and the axle assembly 14 can be mounted in a vehicle in any desired manner, including with independent suspension axle arrangements or otherwise. As shown in FIG. 2, the axle assembly 14 includes an electric motor 18 and a drive assembly 20 coupled between the electric motor 18 and the vehicle wheels 16, to provide power from the motor 18 to the wheels 16 in a desired manner. In at least some implementations, and as set forth in more detail below, the drive assembly 20 includes two stages of gear reduction 22, 24, a differential 26 and a clutch 28. The axle assembly 14 may be used in an electric vehicle in which all motive power is provided by the electric motor 18, or in a hybrid vehicle that includes a combustion engine and the electric motor 18.

As shown in FIG. 2, the electric motor 18 has an output shaft 30 that is rotated by the motor 18 about a first axis 32, and that is coupled to the drive assembly 20. Electric power to the electric motor 18 may be provided in known manner via an inverter 34 (shown in FIG. 1) that is coupled to a power source, such as a battery pack 36.

The drive assembly 20 includes a drive gear 38 that is coupled to and driven by the motor output shaft 30, to drive a first gear reduction stage 22 which in turn drives a second gear reduction stage 24. The gear reduction stages 22, 24 reduce rotary speed of the gears and increase the torque output from the gear stages. Further, to control torque distribution between the wheels 16 driven by the axle assembly 14, the axle assembly 14 includes a differential 26 and a clutch 28. The differential 26 permits the wheels 16 to rotate at different rates, and the clutch 28 permits selective locking of side shafts 40, 42 to which the wheels 16 are connected, so that the wheels 16 rotate at the same rate, and the clutch 28 might or might not have limited slip capabilities, as set forth in more detail below.

In more detail, the first gear reduction stage 22 includes the drive gear 38 which defines a first stage input gear and is coupled to a first stage output gear 44 that is larger than the drive gear 38. The first stage output gear 44 is coupled to and rotates with an intermediate gear 46 which may define a compound gear train. The intermediate gear 46 is coupled to and rotates a differential input gear 48 which may be a ring gear that is coupled to and rotates with a housing of the differential 26. In at least some implementations, the intermediate gear 46 may include two gears coupled together by an intermediate shaft 47 to provide lateral/axial spacing (relative to an axis 49 of the intermediate gears 46, which may be radially offset from and parallel to the first axis 32 in at least some implementations).

The differential 26 includes pinion gears 50 that are rotated by the differential input gear 48, and a pair of side gears 52 that are coupled to and rotated by the pinion gears 50. Each side gear 52 is coupled to a respective one of a pair of differential output shafts 54, 56 that rotate with their respective side gear 52. That is, a first side gear 52 is coupled to and rotates a first differential output shaft 54, and a second side gear 52 is coupled to and rotates a second differential output shaft 56. In at least some implementations, the first and second differential output shafts 54, 56 may be parallel to each other, offset from the motor output shaft 30 and parallel to the motor output shaft 30, if desired. The differential 26 may be a simple, open differential 26 to reduce the cost, complexity and weight of the differential 26, or it may be a limited slip differential 26, such as a passive, mechanical torque-sensing limited slip differential, or otherwise include a clutch mechanism. When relative rotation is permitted by the differential 26, the first differential output shaft 54 may rotate at a different rate than the second differential output shaft 56.

Each differential output shaft 54, 56 is coupled to a separate one of a pair of second stage input gears 58, 60, of the second gear reduction stage 24. And each of the second stage input gears 58, 60 is coupled to and rotates a separate, second stage output gear 62, 64 of the second gear reduction stage. The second stage output gears 62, 64 are connected to separate side shafts 40, 42 that are each connected to a separate one of the wheels 16. In the example shown, the side shafts 40, 42 are arranged coaxial and parallel with the motor 18 and the motor output shaft 30, and so are radially offset from and not coaxial with the differential output shafts 54, 56 or the differential input gear 48. As noted above, because the second stage input gears 58, 60 may rotate at different speeds, the second stage output gears 62, 64 may rotate at different speeds and thus, the side shafts 40, 42 of the axle assembly 14 may rotate at different speeds to permit the wheels 16 to rotate at different speeds.

In at least some implementations, such as that shown in FIG. 2, the clutch 28 is coupled to and between the side shafts 40, 42, and is separate from the differential 26. The clutch 28 is arranged to selectively couple the side shafts 40, 42 together to reduce or eliminate relative rotation between the shafts. The clutch 28 may lock the side shafts 40, 42 together so that the shafts co-rotate (e.g. rotate together and at the same rotary speed) or the clutch 28 may permit limited slipping or limited relative rotation between the side shafts 40, 42 so that the side shafts do not rotate at the same rotary speed during instances of limited slip.

The drive gear 38 and the gears within the gear reduction stages 22, 24 may be constructed and arranged in any suitable way. For example, these gears may be or include spur gears, bevel gears, helical gears, hypoid gears, planetary gear sets, and combinations of these gear types and arrangements. Further, the clutch 28 may be a friction clutch including one or more friction plates 65, or a positive clutch that engages overlapped/meshed teeth, like a dog clutch. In at least some implementations, the clutch is an active limited slip clutch, an electronic locking clutch, or a passive/mechanical speed-sensing or torque-biasing clutch.

Figure 3:
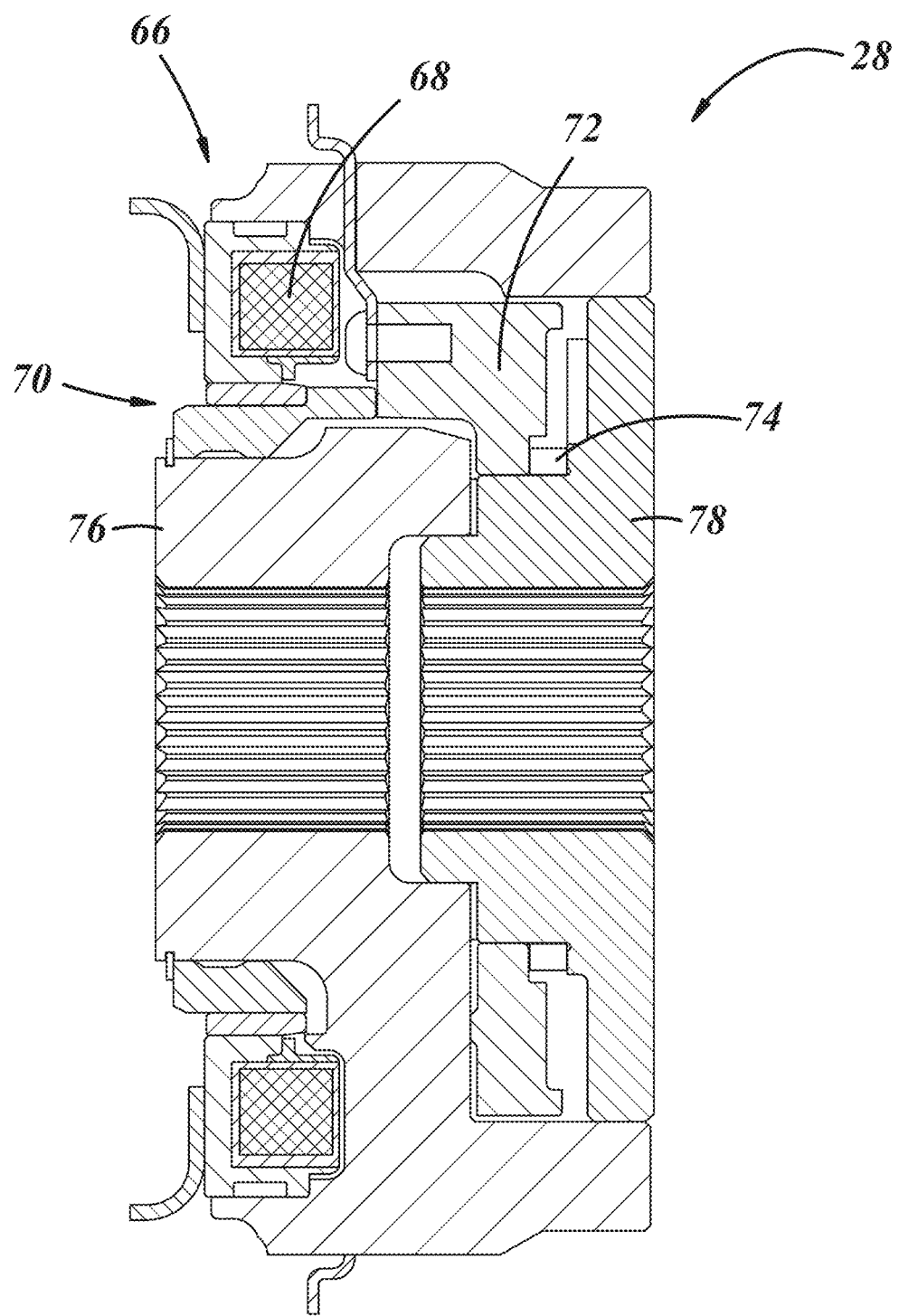
FIG. 3 is a sectional view of part of a clutch of the axle assembly.

As shown in FIG. 3, the clutch 28 may be a dog clutch that may be electrically driven such as with a linear actuator which may include an electromagnetic source, like a solenoid actuator 66. The actuator 66 may be arranged as set forth in U.S. Published Patent Application No. 2023/0296141, the disclosure of which is incorporated herein by reference in its entirety. In general, the actuator includes a wire coil 68 that generates an electromagnetic field when electricity is supplied to the coil 68. The electromagnetic field displaces a plunger 70 that in turn displaces a drive member 72 to change the clutch 28 from the decoupled state to the coupled state in which a first part 76 and a second part 78 of the clutch are engaged. In at least some implementations, when electricity is not provided to the coil 68, one or more springs 74 may displace the driver member 72 in the opposite direction to permit the clutch to return to the decoupled state in which the clutch is disengaged. Other arrangements may be used. For example, the force moving the plunger and drive member to couple/engage the clutch may be provided by one or more springs, and the force moving the plunger and driver member to decouple/disengage the clutch may be provided by the solenoid coil 68 and an electromagnetic field, which may drive the plunger in one or both directions, as desired.

Further, other actuators may be used to change the state of the clutch. For example, without limitation, a motor may rotate a cam to cause axial displacement and ultimately, a change of state of the clutch. The cam could be part of a ball ramp actuator or other mechanism, such as a pilot-clutch actuated ball ramp, rotary cam, active hydraulic actuator, passive/mechanical hydraulic pump actuator, or a viscous shear pump actuator, by way of some examples.

As shown in FIG. 2, the first side shaft 40 may be coupled to a first part 76 of the clutch 28 and the second side shaft 42 may be coupled to a second part 78 of the clutch. In a first state of the clutch 28, which may be a decoupled state, relative rotation of the side shafts 40, 42 may be permitted, as permitted by the differential 26. In a second state of the clutch 28, relative rotation of the side shafts 40, 42 is prevented or substantially inhibited.

In at least some implementations, the differential 26 is arranged between the first gear reduction stage and the second gear reduction stage. The differential input gear 48 is thus driven by the first stage output (via gears 44, 46) and at a faster rate than the second stage output gears 62, 64. As the differential 26, in at least some implementations, is continually engaged with the gears 46, there is no engagement/disengagement cycling or syncing needed.

The clutch 28, on the other hand, has both coupled and decoupled states, and engaging the clutch 28 at higher speeds can cause higher lash, noise and wear. Further, a larger clutch 28 might be needed to handle the higher speeds and engagement energy, in at least some applications.

In the implementation shown in FIG. 2, the clutch 28 is downstream of the differential 26 and the second gear reduction stage, so that the clutch parts 76, 78 are rotated at the same speed as the side shafts 40, 42 and wheels 16. That is, the clutch 28 is located at the full gear reduction of the axle assembly 14 which is the lowest rotary speed location of the axle assembly 14. This reduces the lash, noise and engagement energy, and can permit optimization of the clutch 28 and its components.

In at least some implementations, the first gear reduction stage may provide a gear ratio of between 2 to 3, and the second gear reduction stage may provide a gear ratio of between 3 to 4. Further, in the example shown, the differential input gear 48 is larger than the intermediate gears 46 which provides a speed reduction, and may be considered a third stage of gear reduction (between the first and second stages). The gear reduction may be provided in one or any desired number of stages, to achieve a desired total gear reduction. In at least some implementations, the total gear reduction might be up to 10:1, with representative examples between 3:1 and 8:1.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An axle assembly, comprising:
a first gear reduction stage including a first stage input gear coupled to and rotating a first stage output gear;
a differential including a differential input gear coupled to the first stage output gear, a pinion gear, a first side gear coupled to the pinion gear and a second side gear coupled to the pinion gear, a first differential output shaft that is coupled to and rotated by the first side gear, and a second differential output shaft coupled to and rotating with the second side gear;
a second gear reduction stage including a pair of second stage input gears with a first one of the second stage input gears being coupled to and rotated by the first differential output shaft, and with a second one of the second stage input gears being coupled to and rotated by the second differential output shaft, and wherein the second gear reduction stage includes a pair of second stage output gears, with a first one of the second stage output gears being coupled to and rotated by the first one of the second stage input gears, and with a second one of the second stage output gears being coupled to and rotated by the second one of the second stage input gears; and
a first side shaft coupled to and rotated by the first one of the second stage output gears;
a second side shaft coupled to and rotated by the second one of the second stage output gears;
a clutch connected to the first side shaft and to the second side shaft and having a decoupled state in which relative rotation between the first side shaft and the second shaft is permitted and a coupled state in which relative rotation between the first side shaft and second side shaft is prevented in at least some operating conditions;
a motor; and
a drive gear rotated by the motor, wherein the drive gear is coupled to and rotates with the first stage input gear and the drive gear is coaxial with the first side shaft and the second side shaft.

2. The axle assembly of claim 1 wherein the motor has a motor output shaft that is coupled to the drive gear, and the motor output shaft is coaxial with the drive gear.

3. The axle assembly of claim 1 wherein the differential is an open differential.

4. The axle assembly of claim 1 wherein the clutch is a friction clutch or a dog clutch.

5. The axle assembly of claim 1 wherein the clutch is a friction clutch that includes limited slip capability.

6. The axle assembly of claim 1 wherein a first part of the clutch is coupled to and rotates with the first side shaft and a second part of the clutch is coupled to and rotates with the second side shaft, and wherein the first part of the clutch is engageable with the second part of the clutch in the coupled state.

7. The axle assembly of claim 1 wherein the first differential output shaft is capable of rotating at a different rate than the second differential output shaft.

8. The axle assembly of claim 7 wherein the first one of the second stage input gears is capable of rotating at a different rate than the second one of the second stage input gears.

9. The axle assembly of claim 2 wherein the first differential output shaft and the second differential output shaft are parallel to each other and parallel to the motor output shaft.

10. An axle assembly, comprising:
a drive gear adapted to be rotated by a motor;
a first gear reduction stage including a first stage input that is driven by the drive gear and rotates at a first speed and a first stage output that rotates at a second speed that is less than the first speed;
a second gear reduction stage including a second stage input that rotates at the second speed and a second stage output that rotates at a third speed that is less than the second speed;
a differential having an input gear rotated by the first stage output, the differential has a first output that rotates at a first output speed and a second output that rotates at a second output speed, where the first output speed and second output speed may be the same or different;
a first side shaft coupled to and rotated by the first output;
a second side shaft coupled to and rotated by the second output; and
a clutch connected to the first side shaft and to the second side shaft and having a decoupled state in which relative rotation between the first side shaft and the second shaft is permitted and a coupled state in which relative rotation between the first side shaft and second side shaft is prevented in at least some operating conditions, and wherein the drive gear is coaxial with the first side shaft and the second side shaft.

11. The axle assembly of claim 10 wherein the second stage input includes a first input gear coupled to the first output and a second input gear coupled to the second output, and wherein the second stage output includes a first output gear coupled to the first input gear, and a second output gear coupled the second input gear, and wherein the first side shaft is coupled to the first output through the first output gear and the first input gear, and the second side shaft is coupled to the second output through the second output gear and the second input gear.

12. The axle assembly of claim 10 which also includes a motor having a motor output shaft that is coupled to the drive gear, and wherein the motor and motor output shaft are coaxial with the drive gear.

13. The axle assembly of claim 11 which also includes a motor having a motor output shaft that is coupled to the drive gear, and wherein the motor and motor output shaft are coaxial with the drive gear.

14. The axle assembly of claim 13 wherein the first output of the differential and the second output of the differential are parallel to each other and parallel to an axis of rotation of the drive gear.

15. An axle assembly including a gear train having multiple outputs that rotate at different speeds, a differential engaged with a first output at a first speed, a clutch engaged with a second output at a second speed, wherein the second speed is lower than the first speed, and a drive gear configured to be rotated by a motor, the drive gear is arranged to cause rotation of gears in the gear train, and wherein the clutch is connected to a first side shaft that is configured to be coupled to a first wheel of a vehicle, the clutch is connected to a second side shaft that is configured to be coupled to a second wheel of the vehicle, and the clutch has a decoupled state in which relative rotation between the first side shaft and the second shaft is permitted and a coupled state in which relative rotation between the first side shaft and second side shaft is prevented in at least some operating conditions, and the drive gear is coaxial with the first side shaft and the second side shaft.

16. The axle assembly of claim 15 wherein the first output is radially spaced from the second output, relative to axes of rotation of the differential and the clutch.

17. The axle assembly of claim 1 wherein the differential includes a housing in which the pinion gear, the first side gear and the second side gear are located, and wherein the differential input gear is coupled to and rotates with the housing.

18. The axle assembly of claim 10 wherein the differential includes a housing and the differential input gear is coupled to and rotates with the housing.

19. The axle assembly of claim 15 wherein the differential includes a housing and a differential input gear that is coupled to and rotates with the housing, and wherein the differential input gear is rotated at the first speed.

* * * * *